US010924495B2

United States Patent
Liu

(10) Patent No.: US 10,924,495 B2
(45) Date of Patent: Feb. 16, 2021

(54) VERIFICATION METHOD, APPARATUS, AND SYSTEM USED FOR NETWORK APPLICATION ACCESS

(71) Applicant: Huawei Technologies Co., Ltd., Shenzhen (CN)

(72) Inventor: Shucheng Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 214 days.

(21) Appl. No.: 15/696,721

(22) Filed: Sep. 6, 2017

(65) Prior Publication Data
US 2017/0366558 A1    Dec. 21, 2017

Related U.S. Application Data

(63) Continuation of application No. PCT/CN2016/075633, filed on Mar. 4, 2016.

(30) Foreign Application Priority Data

Mar. 7, 2015 (CN) .......................... 201510100437.7

(51) Int. Cl.
*H04L 29/06* (2006.01)
*H04L 9/32* (2006.01)
(Continued)

(52) U.S. Cl.
CPC .......... *H04L 63/107* (2013.01); *H04L 9/0872* (2013.01); *H04L 9/3213* (2013.01);
(Continued)

(58) Field of Classification Search
CPC ... H04L 63/107; H04L 9/0872; H04L 9/3213; H04L 29/06; H04L 63/0807;
(Continued)

(56) References Cited

U.S. PATENT DOCUMENTS 8,448,238 B1    5/2013 Gupta et al.
9,781,053 B1 * 10/2017 Allen ..................... H04L 47/74
(Continued)

FOREIGN PATENT DOCUMENTS

CN    101582769 A    11/2009
CN    101631023 A    1/2010
(Continued)

OTHER PUBLICATIONS

"OpenFlow Switch Specification", Open Networking Foundation Version 1.4.0 (Wire Protocol 0x05), ONF TS-012 (Oct. 14, 2013).

*Primary Examiner* — Ali S Abyaneh
*Assistant Examiner* — Zoha Piyadehghibi Tafaghodi
(74) *Attorney, Agent, or Firm* — Leydig, Voit & Mayer, Ltd.

(57) ABSTRACT

This application provides a verification method, apparatus, and system that are used for network application access, and the method includes: performing, by a verification server, user identity verification on a terminal, where the user verification request includes first location information; generating, by the verification server, an encrypted token according to the first location information in the user verification request after determining that the terminal succeeds in the user identity verification; and sending, by the verification server, the encrypted token to a control device. It may be determined whether a terminal that performs content access is a terminal used by a user on which user verification is performed. Therefore, this can effectively avoid an application-layer-based network attack such as an MITM attack, and further effectively improve security of the network application access.

11 Claims, 10 Drawing Sheets

(51) Int. Cl.
*H04L 9/08* (2006.01)
*H04W 12/00* (2021.01)
*H04L 29/08* (2006.01)

(52) U.S. Cl.
CPC .......... *H04L 29/06* (2013.01); *H04L 63/0807* (2013.01); *H04L 63/101* (2013.01); *H04L 63/123* (2013.01); *H04L 63/0876* (2013.01); *H04L 67/18* (2013.01); *H04W 12/00503* (2019.01)

(58) Field of Classification Search
CPC . H04L 63/101; H04L 63/123; H04L 63/0876; H04L 67/18; H04W 12/00503
USPC .......................................................... 726/4
See application file for complete search history.

(56) References Cited

U.S. PATENT DOCUMENTS

| | | | |
|---|---|---|---|
| 2003/0159066 A1 | 8/2003 | Staw et al. | |
| 2004/0204182 A1 | 10/2004 | Angelo et al. | |
| 2007/0136603 A1* | 6/2007 | Kuecuekyan | G06F 21/6218 713/185 |
| 2009/0193507 A1 | 7/2009 | Ibrahim | |
| 2012/0028609 A1* | 2/2012 | Hruska | G06Q 20/3674 455/411 |
| 2013/0138957 A1* | 5/2013 | Dharmarajan | H04L 63/0428 713/168 |
| 2013/0208893 A1* | 8/2013 | Shablygin | H04L 9/0822 380/277 |
| 2013/0252583 A1 | 9/2013 | Brown et al. | |
| 2015/0100788 A1* | 4/2015 | Chastain | H04L 63/08 713/169 |
| 2015/0365405 A1 | 12/2015 | Kalinichenko et al. | |

FOREIGN PATENT DOCUMENTS

| | | |
|---|---|---|
| CN | 102217277 A | 10/2011 |
| CN | 104021333 A | 9/2014 |
| CN | 104216907 A | 12/2014 |
| WO | 2014179076 A1 | 11/2014 |

* cited by examiner

VERIFICATION METHOD, APPARATUS, AND SYSTEM USED FOR NETWORK APPLICATION ACCESS

CROSS-REFERENCE TO RELATED APPLICATIONS

This application is a continuation of International Application No. PCT/CN2016/075633, filed on Mar. 4, 2016, which claims priority to Chinese Patent Application No. 201510100437.7, filed on Mar. 7, 2015. The disclosures of the aforementioned applications are hereby incorporated by reference in their entireties.

TECHNICAL FIELD

The present invention relates to the field of network application access security, and in particular, to a verification method, a verification server, a forwarding device, a control device, and a verification system that are used for network application access.

BACKGROUND

An application service provider (ASP) deploys, manages, and maintains an application program and an access object such as data required by the application program on a terminal, and then provides an application program processing capability for the terminal by using a wide area network. An operation manner of the ASP may be cooperating with an Internet service provider (ISP) to deploy, the application program on a hardware device and a network architecture that are provided by the ISP. In this way, the ASP deploys and manages the application program and the data required by the application program, the ISP provides the hardware device and the network architecture of the application program and the data required by the application program, and a user of the application program and the data required by the application program is a customer of the ASP.

Based on the foregoing operation manner, when a terminal accesses a network application, a verification server set by the ASP may perform user identity verification on the terminal, that is, identity verification on the terminal is performed in the verification server that is set by the ASP, and the terminal obtains a permission after the identity verification succeeds. The terminal may access, according to the permission of the terminal, a to-be-accessed object that is set on the hardware device of the ISP.

Because the verification server set by the ASP performs application-layer-based digital rights management (DRM) on the terminal, the verification server is vulnerable to an application-layer-based network attack, such as a man-in-the-middle attack (MITM attack). Therefore, there is a security risk.

SUMMARY

Embodiments of the present invention provide a verification method, a verification server, a forwarding device, a control device, and a verification system that are used for network application access, to help improve security and resolve a problem of a security risk.

A first aspect provides a verification method used for network application access, including:

performing, by a verification server according to a user verification request from a terminal, user identity verification on the terminal, where the user verification request includes first location information, and the first location information is used to identify a network location at which the terminal is located when sending the user verification request;

generating, by the verification server, an encrypted token according to the first location information in the user verification request after determining that the terminal succeeds in the user identity verification, where the encrypted token includes the first location information and an access permission of a user, and the access permission of the user includes a list of content that can be accessed by the user; and sending, by the verification server, the encrypted token to a control device.

With reference to the first aspect, in a first possible implementation of the first aspect, the method further includes:

receiving, by the verification server, a user exit request sent by the terminal, where the user exit request includes second location information, and the second location information is used to identify a network location at which the terminal is located when sending the user exit request;

generating, by the verification server, a token cancellation request according to the second location information, where the token cancellation request includes the second location information; and sending, by the verification server, the token cancellation request to the control device.

A second aspect provides a verification method used for network application access, including:

receiving, by a forwarding device, a content access request sent by a terminal, where the content access request includes an encrypted token, the encrypted token includes first location information, and the first location information is used to identify a network location at which the terminal is located when sending the user verification request;

sending, by the forwarding device, the encrypted token to a control device;

receiving, by the forwarding device, a first message sent by the control device, where the first message includes an access permission of the user, and the first message is used to indicate that the terminal succeeds in verification; and providing, by the forwarding device according to the access permission of the user in the first message, the terminal with content requested by the terminal.

With reference to the second aspect, in a first possible implementation of the second aspect, the content access request further includes second location information, content of the second location information is the same as that of the first location information, and the method further includes:

sending, by the forwarding device, the second location information to the control device.

With reference to the first possible implementation of the second aspect, a second possible implementation of the second aspect is further provided, where the content access request further includes third location information, the third location information is used to identify a network location at which the terminal is located when sending the content access request, the third location information is different from the second location information, and the method further includes:

obtaining, by the forwarding device, the third location information from the content access request; and sending, by the forwarding device, the third location information to the control device.

A third aspect provides a verification method used for network application access, including:

receiving, by a control device, a first encrypted token sent by a verification server, where the first encrypted token includes first location information and an access permission of a user, the first location information is used to identify a network location at which the terminal is located when sending the user verification request, and the access permission of the user includes a list of content that can be accessed by the user;

generating, by the control device, a second encrypted token according to the first encrypted token, where the second encrypted token includes the first location information;

sending, by the control device, the second encrypted token to the terminal;

receiving, by the control device, the second encrypted token sent by a forwarding device;

performing, by the control device, verification on the second encrypted token according to the first encrypted token; and sending, by the control device, a first message to the forwarding device after the verification on the second encrypted token succeeds, where the first message includes the access permission of the user, and the first message is used to indicate that the terminal succeeds in verification.

With reference to the third aspect, in a first possible implementation of the third aspect, the method further includes:

receiving, by the control device, second location information sent by the forwarding device, where the second location information is the same as the first location information;

performing, by the control device, the verification on the terminal according to the second location information and the first location information; and sending, by the control device, the first message to the forwarding device after the terminal succeeds in the verification and the verification on the second encrypted token succeeds.

With reference to the first possible implementation of the third aspect, a second possible implementation of the third aspect is further provided, where the method further includes:

receiving, by the control device, third location information sent by the forwarding device, where the third location information is used to identify a network location at which the terminal is located when sending a content access request, and the third location information is different from the second location information;

generating, by the control device, a third encrypted token according to the third location information, where the third encrypted token includes the third location information; and sending, by the control device, the third encrypted token to the terminal.

With reference to the second possible implementation of the third aspect, a third possible implementation of the third aspect is further provided, where the method further includes:

replacing, by the control device, the first location information in a content provision list with the third location information, to obtain an updated content provision list, where the content provision list is a list generated according to the first encrypted token, the content provision list includes the first location information and the access permission of the user that are included in the first encrypted token, and the updated content provision list includes the third location information and the access permission of the user; or adding, by the control device, the third location information to a content provision list, to obtain an updated content provision list, where the content provision list is a list generated according to the first encrypted token, the content provision list includes the first location information and the access permission of the user that are included in the first encrypted token, and the updated content provision list includes the third location information, and the first location information and the access permission of the user that are included in the first encrypted token.

With reference to any one of the third aspect, the first possible implementation of the third aspect, the second possible implementation of the third aspect, or the third possible implementation of the third aspect, a fourth possible implementation of the third aspect is further provided, where the method further includes:

receiving, by the control device, a token cancellation request sent by the verification server, where the token cancellation request includes fourth location information of the terminal, and the fourth location information is used to identify a network location at which the terminal is located when sending a user exit request; and canceling, by the control device according to the fourth location information, an encrypted token that matches the fourth location formation.

A fourth aspect provides a verification server, including:

an identity verification module, configured to perform, according to a user verification request from a terminal, user identity verification on the terminal, where the user verification request includes first location information, and the first location information is used to identify a network location at which the terminal is located when sending the user verification request;

a token generation module, configured to generate an encrypted token according to the first location information in the user verification request after it is determined that the terminal succeeds in the user identity verification, where the encrypted token includes the first location information and an access permission of a user, and the access permission of the user includes a list of content that can be accessed by the user; and a first sending module, configured to send the encrypted token to a control device.

With reference to the fourth aspect, in a first possible implementation of the fourth aspect, the method further includes:

a receiving module, configured to receive a user exit request sent by the terminal, where the user exit request includes second location information, and the second location information is used to identify a network location at which the terminal is located when sending the user exit request;

a cancellation request generation module, configured to generate a token cancellation request according to the second location information, where the token cancellation request includes the second location information; and a second sending module, configured to send the token cancellation request to the control device.

A fifth aspect provides a forwarding device, including:

a first receiving module, configured to receive a content access request sent by a terminal, where the content access request includes an encrypted token, the encrypted token includes first location information, and the first location information is used to identify a network location at which the terminal is located when sending the user verification request;

a first sending module, configured to send the encrypted token to a control device;

a second receiving module, configured to receive a first message sent by the control device, where the first message includes an access permission of the user, and the first message is used to indicate that the terminal succeeds in verification; and a second sending module, configured to provide, according to the access permission of the user in the first message, the terminal with content requested by the terminal.

With reference to the fifth aspect, in a first possible implementation of the fifth aspect, the content access request further includes second location information, content of the second location information is the same as that of the first location information, and the forwarding device further includes:

a third sending module, configured to send the second location information to the control device.

With reference to the first possible implementation of the fifth aspect, a second possible implementation of the fifth aspect is further provided, where the content access request further includes third location information, the third location information is used to identify a network location at which the terminal is located when sending the content access request, the third location information is different from the second location information, and the forwarding device further includes:

a location obtaining module, configured to obtain the third location information from the content access request; and a fourth sending module, configured to send the third location information to the control device.

A sixth aspect provides a control device, and the control device includes:

a first receiving module, configured to receive a first encrypted token sent by a verification server, where the first encrypted token includes first location information and an access permission of a user, the first location information is used to identify a network location at which the terminal is located when sending the user verification request, and the access permission of the user includes a list of content that can be accessed by the user;

a token generation module, configured to generate a second encrypted token according to the first encrypted token, where the second encrypted token includes the first location information;

a first sending module, configured to send the second encrypted token to the terminal;

a second receiving module, configured to receive the second encrypted token sent by a forwarding device;

a token verification module, configured to perform verification on the second encrypted token according to the first encrypted token; and a second sending module, configured to send a first message to the forwarding device after the verification on the second encrypted token succeeds, where the first message includes the access permission of the user, and the first message is used to indicate that the terminal succeeds in verification.

With reference to the sixth aspect, in a first possible implementation of the sixth aspect, the control device further includes:

a third receiving module, configured to receive second location information sent by the forwarding device, where the second location information is the same as the first location information;

a terminal verification module, configured to perform the verification on the terminal according to the second location information and the first location information; and a third sending module, configured to send the first message to the forwarding device after the terminal succeeds in the verification and the verification on the second encrypted token succeeds.

With reference to the first possible implementation of the sixth aspect, a second possible implementation of the sixth aspect is further provided, where the control device further includes:

a fourth receiving module, configured to receive third location information sent by the forwarding device, where the third location information is used to identify a network location at which the terminal is located when sending a content access request, and the third location information is different from the second location information;

a token update module, configured to generate a third encrypted token according to the third location information, where the third encrypted token includes the third location information; and a fourth sending module, configured to send the third encrypted token to the terminal.

With reference to the second possible implementation of the sixth aspect, a third possible implementation of the sixth aspect is further provided, where the control device further includes an update module, where the update module is configured to replace the first location information in a content provision list with the third location information, to obtain an updated content provision list, where the content provision list is a list generated according to the first encrypted token, the content provision list includes the first location information and the access permission of the user that are included in the first encrypted token, and the updated content provision list includes the third location information and the access permission of the user; or the update module is configured to add the third location information to a content provision list, to obtain an updated content provision list, where the content provision list is a list generated according to the first encrypted token, the content provision list includes the first location information and the access permission of the user that are included in the first encrypted token, and the updated content provision list includes the third location information, and the first location information and the access permission of the user that are included in the first encrypted token.

With reference to any one of the sixth aspect, the first possible implementation of the sixth aspect, the second possible implementation of the sixth aspect, or the third possible implementation of the sixth aspect, a fourth possible implementation of the sixth aspect is further provided, where the control device further includes:

a fifth receiving module, configured to receive a token cancellation request sent by the verification server, where the token cancellation request includes fourth location information of the terminal, and the fourth location information is used to identify a network location at which the terminal is located when sending a user exit request; and a token cancellation module, configured to cancel, according to the fourth location information, an encrypted token that matches the fourth location formation.

A seventh aspect provides a verification system used for network application access, and the system includes:

the verification server provided in the fourth aspect or the first possible implementation of the fourth aspect, the forwarding device provided in the fifth aspect, the first possible implementation of the fifth aspect, or the second possible implementation of the fifth aspect, and the control device provided in the sixth aspect or any possible implementation of the sixth aspect.

In the method and apparatus provided in the embodiments of the present invention, after a terminal succeeds in user identity verification, a verification server generates an encrypted token according to obtained network location information of the terminal and an access permission of a user, and the verification server sends the encrypted token to a control device. The control device generates, according to the network location information included in the encrypted token from the verification server, an encrypted token used to verify the terminal. The encrypted token used to verify the terminal includes the network location information of the terminal. The control device sends the encrypted token used to verify the terminal to the terminal, and performs, by using the encrypted token used to verify the terminal, verification on the terminal that requests to access content cached on a forwarding device. According to the method and apparatus provided in the embodiments of the present invention, verification needs to be performed multiple times by different network devices. For example, the user identity verification is performed by the verification server, and terminal verification is performed by the control device each time the terminal requests to access the content on the forwarding device. This helps avoid an application-layer-based network attack such as an MITM attack, and improves security of network application access.

DESCRIPTION OF EMBODIMENTS

Embodiments of the present invention provide a verification method, a verification server, and a verification system that are used for network application access. Preferred embodiments of the present invention are described below with reference to accompanying drawings of this specification. It should be understood that the preferred embodiments described herein are merely used to describe and explain the present invention, but are not intended to limit the present invention. Moreover, when no conflict occurs, the embodiments in the present invention and features in the embodiments may be mutually combined.

The embodiments provided in the present invention may be applied to software-defined networking (SDN) or a content delivery network (CDN).

Figure 1:
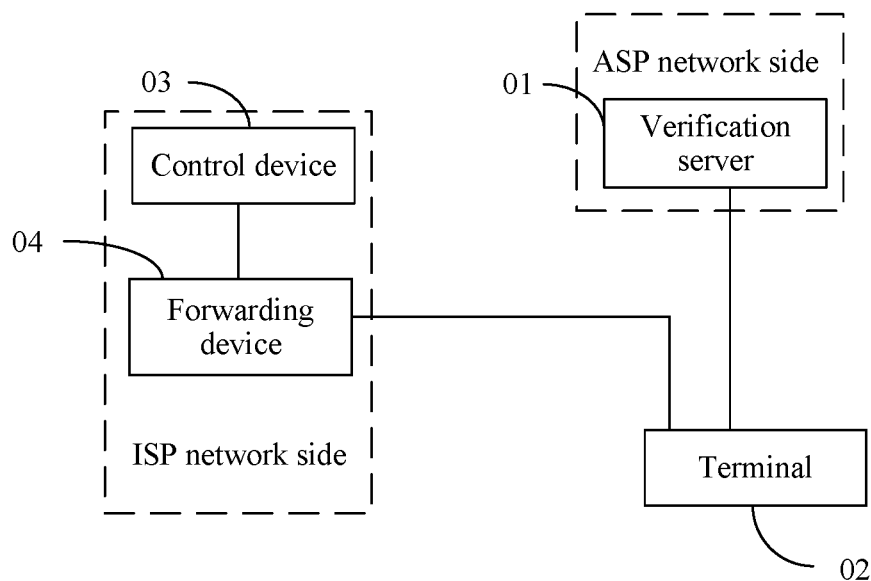
FIG. 1 is a flowchart of a verification method used for network application access according to an embodiment of the present invention.

An application scenario provided in the embodiments of the present invention may be a scenario shown in FIG. 1. As shown in FIG. 1, the application scenario may include a forwarding device 04, a verification server 01 disposed on an ASP network side, and a control device 03 disposed on an ISP network side.

The verification server may store identity information of a user, and the user is a user that is verified to be valid. The identity information may include identification information and a password of the user. The identification information of the user may be information used to identify the user, such as a user name, an ID of the user, or an email address of the user. Identity information of the user that may be used is not further separately illustrated herein.

The verification server receives a user verification request from a terminal, and performs user identity verification on the terminal. The user verification request may carry identity information of a user that uses the terminal. For example, the verification server may perform the user identity verification on the terminal according to the identity information of the user that is carried in the user verification request and identity information of a user that is stored in the verification server. A verification process is not specifically described herein.

An object to be accessed by the terminal is cached on the forwarding device. The forwarding device may be a device that can forward data, a packet, a message, or a control instruction, such as a router, or a switch. The forwarding device can obtain a network location of a terminal that communicates with the forwarding device.

The control device may perform verification on a terminal, and may further control the forwarding device to provide the terminal with an object to be accessed by the terminal. That is, a terminal that succeeds in verification performed by the control device can access content that is provided by the forwarding device and corresponding to the terminal.

Embodiment 1

Figure 2:
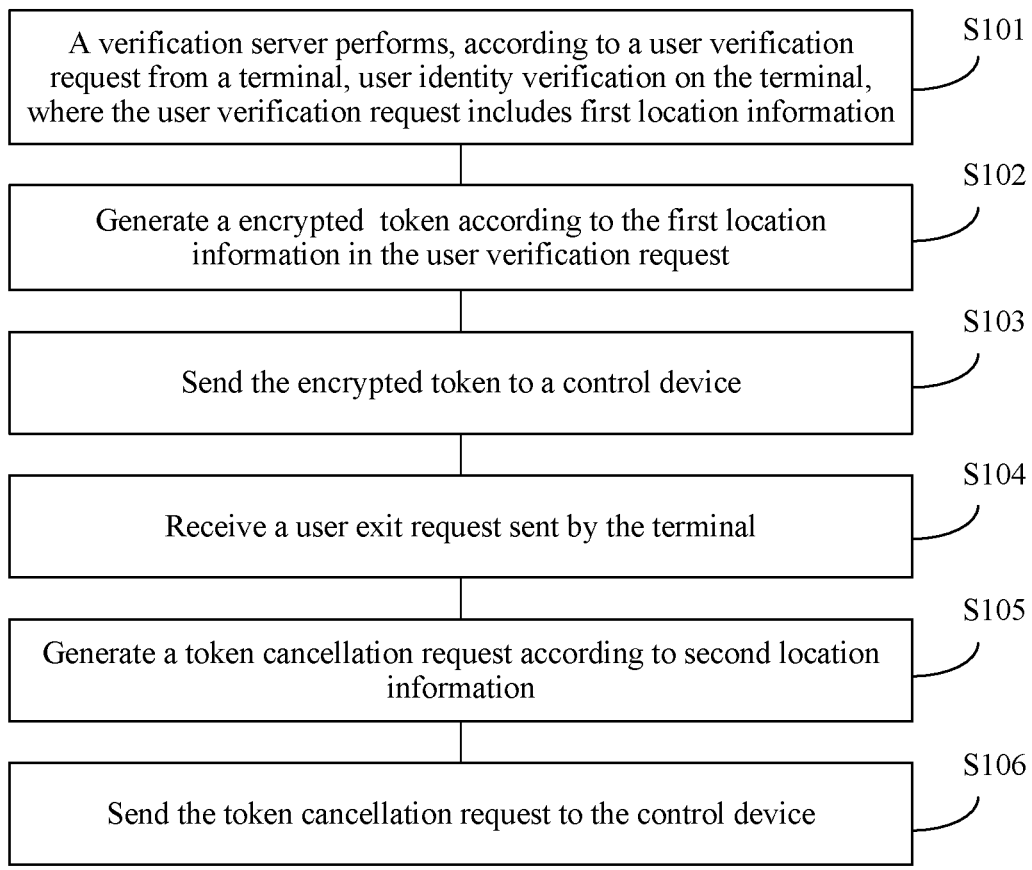
FIG. 2 is another flowchart of a verification method used for network application access according to an embodiment of the present invention.

This embodiment of the present invention provides a verification method used for network application access. As shown in FIG. 2, FIG. 2 is a flowchart of the verification method used for network application access according to this embodiment of the present invention. In the embodiment corresponding to FIG. 2, the verification method used for network application access is described from a perspective of a verification server. The verification method provided in this embodiment of the present invention is specifically as follows:

S101. The verification server performs, according to a user verification request from a terminal, user identity verification on the terminal, where the user verification request includes first location information, and the first location information is used to identify a network location at which the terminal is located when sending the user verification request.

For example, a user may access a to-be-accessed object on a forwarding device by using the terminal. The terminal needs to succeed in the identity verification performed by the verification server, to determine validity of the user. For example, the verification server receives the user verification request from the terminal. The user verification request may include a user name and a password of the user, or the user verification request includes a certificate and a signature of the user. Information and a manner that may be used for user validity verification at an application layer are not further separately listed herein.

For example, the verification server may further obtain the first location information from the user verification request. Specifically, the first location information is the network location at which the terminal is located when sending the user verification request. If network locations at which the terminal is located before sending the user verification request and when sending the user verification request remain unchanged, the first location information is the network location at which the terminal is located before sending the user verification request. If the network location at which the terminal is located before sending the user verification request is changed, the first location information may be the network location at which the terminal is located when generating the user verification request. The first location information may be obtained by the terminal according to the network location at which the terminal is located when sending the user verification request, and the first location information is added to the user verification request; or may be obtained by the verification server by parsing data of the user verification request sent by the terminal.

For example, a network location of the terminal may be one or any combination of an Internet Protocol (IP) address, a Media Access Control (MAC) address, and an international mobile equipment identity (IMEI) of the terminal, that is, both the network location of the terminal and the first location information of the terminal may be a network location at which the terminal is located at a stage. For example, the first location information may be an IP address, a MAC address, or an IMEI of the terminal when the user verification request is sent. The network location may be further identified by other location information of the terminal, provided that the location of the terminal can be identified in a network, and this is not specifically limited herein.

S102. The verification server generates an encrypted token according to the first location information in the user verification request after determining that the terminal succeeds in the user identity verification, where the encrypted token includes the first location information and an access permission of a user, and the access permission of the user includes a list of content that can be accessed by the user.

For example, after determining that the user on which the identity verification is performed is a valid user, the verification server generates the encrypted token according to the first location information. The encrypted token generated by the verification server is an encrypted token sent to a control device. The encrypted token generated by the verification server enables the control device to determine a terminal that can access content of an object on the forwarding device.

For example, the encrypted token generated by the verification server further includes an access permission of a user that succeeds in identity verification. The first location information is corresponding to the access permission of the user, and helps the control device determine an access permission of a terminal that matches a network location in the first location information.

S103. The verification server sends the encrypted token to a control device.

The verification server sends the encrypted token generated by the verification server to the control device, so that the control device can verify a terminal that performs content access, and can determine a corresponding permission of a valid terminal.

Further, to improve security of the encrypted token, after S103, the method provided in this embodiment of the present invention may further include the following steps.

S104. The verification server receives a user exit request sent by the terminal, where the user exit request includes second location information, and the second location information is used to identify a network location at which the terminal is located when sending the user exit request.

For example, when the user needs to stop accessing content cached on the forwarding device, the verification server receives the user exit request sent by the terminal. The verification server may obtain the second location information. The second location information is used to identify the network location at which the terminal is located when sending the user exit request. If network locations of the terminal at which the terminal is located before sending the user exit request and when sending the user exit request remain unchanged, the second location information may be use to identity the network location at which the terminal is located before sending the user exit request. If the network locations of the terminal at which the terminal is located before sending the user exit request and when sending the user exit request are changed, the second location information may be use to identity the network location at which the terminal is located when generating the user exit request. The second location information may be obtained by the terminal according to the network location at which the terminal is located when sending the user exit request, and the second location information is added to the user exit request; or may be obtained by the verification server by parsing data of the user exit request sent by the terminal.

S105. The verification server generates a token cancellation request according to the second location information, where the token cancellation request includes the second location information.

For example, the token cancellation request includes the second location information when the verification server generates the token cancellation request according to the second location information.

S106. The verification server sends the token cancellation request to the control device.

For example, the verification server can learn a control device to which the terminal belongs. For example, the verification server may have a correspondence between a control device and a network segment, and the network segment may be a network address range that can be used by the terminal.

Optionally, in this embodiment of the present invention, encrypted token cancellation performed by the control device may specifically include: The control device deletes a record corresponding to the encrypted token, and the record corresponding to the encrypted token may include a token identifier, the first location information, and the list of content that can be accessed by the user.

In this embodiment provided by the present invention, a verification server performs user identity verification on a terminal, and generates an encrypted token according to first location information of the terminal after the terminal succeeds in the user identity verification. The verification server sends the generated encrypted token to a control device, to help the control device perform terminal verification for each content access request of the terminal, and help determine whether a terminal that performs content access is a terminal used by a user on which user verification is performed. This effectively avoids an application-layer-based network attack such as an MITM attack, and effectively improves security of network application access.

Embodiment 2

Figure 3:
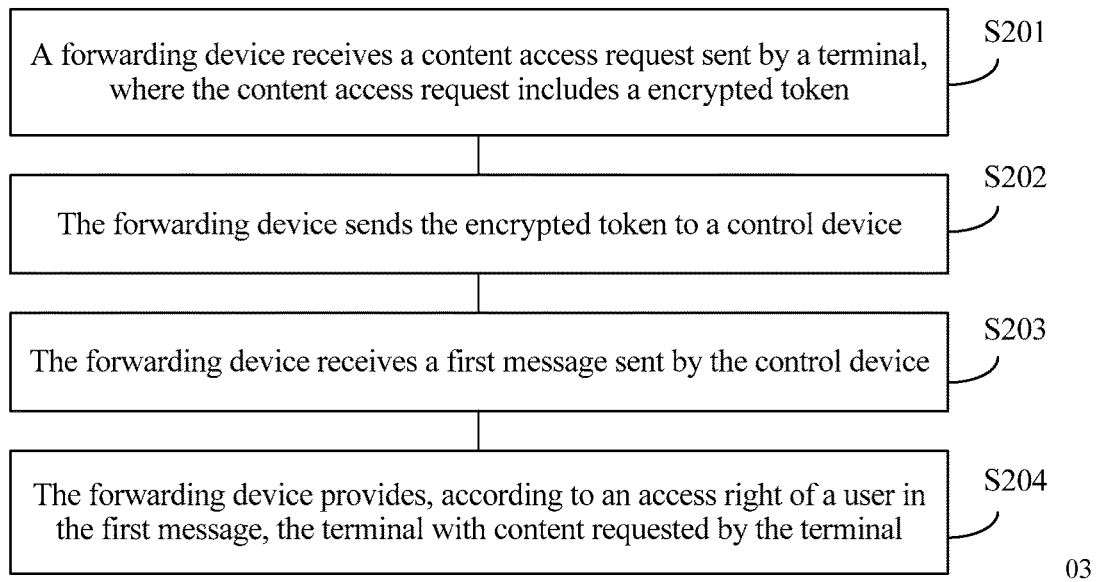
FIG. 3 is still another flowchart of a verification method used for network application access according to an embodiment of the present invention.

In this embodiment corresponding to FIG. 3, a verification method used for network application access is described from a perspective of a forwarding device. As shown in FIG. 3, the method provided in this embodiment of the present invention may include the following content.

S201. The forwarding device receives a content access request sent by a terminal, where the content access request includes an encrypted token, the encrypted token includes first location information, and the first location information is used to identify a network location at which the terminal is located when sending the user verification request.

In this embodiment of the present invention, the forwarding device may specifically include a network device equipped with a cache, for example, may be a switch equipped with a cache. The cache may be specifically used to store an access object of the terminal. In addition, the forwarding device may further forward data, for example, forward, to a control device, data sent by the terminal, or forward, to the terminal, data sent by the control device. Moreover, the forwarding device may further obtain a network location of a terminal that performs data communication with the forwarding device. In a typical application scenario of this embodiment of the present invention, the forwarding device may be disposed in a network on an ISP side.

For example, the encrypted token included in the content access request sent by the terminal is different from the encrypted token generated by the verification server in FIG. 2. The terminal sends the content access request to the forwarding device, and the content access request is used to request for access content from the forwarding device. The content access request may further include an identifier of content to be accessed by the terminal.

S202. The forwarding device sends the encrypted token to a control device.

For example, the forwarding device may obtain the encrypted token from the content access request, and sends the encrypted token to the control device. The forwarding device may learn the control device that controls an access permission of the terminal. For example, the forwarding device stores a correspondence between a content identifier and an identifier of the control device. The forwarding device may determine, according to the identifier of the content to be accessed by the terminal and the stored correspondence, a control device used to perform verification on the terminal. A possible manner of determining the control device is not illustrated by using an example herein.

S203. The forwarding device receives a first message sent by the control device, where the first message includes an access permission of the user, and the first message is used to indicate that the terminal succeeds in verification.

For example, the first message may include a field or an identifier used to indicate that the terminal succeeds in the verification. The first message may be a message that is based on an OpenFlow protocol. A format that may be used by the first message is not described in detail herein.

S204. The forwarding device provides, according to the access permission of the user in the first message, the terminal with content requested by the terminal.

For example, the forwarding device obtains the access permission of the user from the first message. The forwarding device provides, according to a content identifier included in the access permission of the user, the terminal with cached data corresponding to the content identifier. That the forwarding device provides the terminal with content requested by the terminal may be: The forwarding device provides, according to the first location information, the terminal with the data corresponding to the content identifier. The first location information may be from the content access request, or may be from the first message.

Further, in this embodiment of the present invention, the content access request further includes second location information. In S202 or after S202, the method further includes the following steps.

S211. The forwarding device sends second location information to the control device.

In this embodiment of the present invention, the terminal may further add the second location information to the content access request, so as to avoid another invalid terminal fraudulently using a token of a valid terminal. If the second location information in this embodiment of the present invention is used to identify the network location at which the terminal is located when sending the content access request, and the second location information is the same as the first location information, it indicates that the network location does not change after the terminal succeeds in the verification performed by the verification server. Optionally, the second location information may be added to the content access request by the terminal, or may be obtained by the verification server by parsing data of the user verification request sent by the terminal.

Further, in this embodiment of the present invention, the content access request further includes third location information. The third location information is different from the second location information, that is, the network location changes after the terminal succeeds in user identity verification performed by the verification server. The third location information is changed location information, and the second location information is location information prior to a change, that is, the second location information is the same as the first location information. The method further includes the following steps.

S221. The forwarding device obtains a third location information from the content access request.

In this embodiment of the present invention, the forwarding device needs to obtain the third location information, and sends a changed network location to the control device after the network location of the terminal changes. In this way, the location information in the encrypted token used by the terminal is always consistent with a location at which the terminal is located when sending a content access request, thereby improving security of the encrypted token.

The forwarding device obtains the third location information from the content access request, and the third location information is used to identify the location at which the terminal is located when sending the content access request. In this case, the third location information is different from the second location information because the network location of the terminal is changed.

S222. The forwarding device sends the third location information to the control device.

The third location information is sent to the control device, so that the control device may generate an updated encrypted token according to the third location information, to improve the security of the encrypted token.

In this embodiment of the present invention, a forwarding device sends, to a control device, an encrypted token from a terminal, so that the control device performs verification on the encrypted token of the terminal. This can effectively avoid an application-layer-based network attack such as an MITM attack, and effectively improve security of network application access.

Embodiment 3

Figure 4:
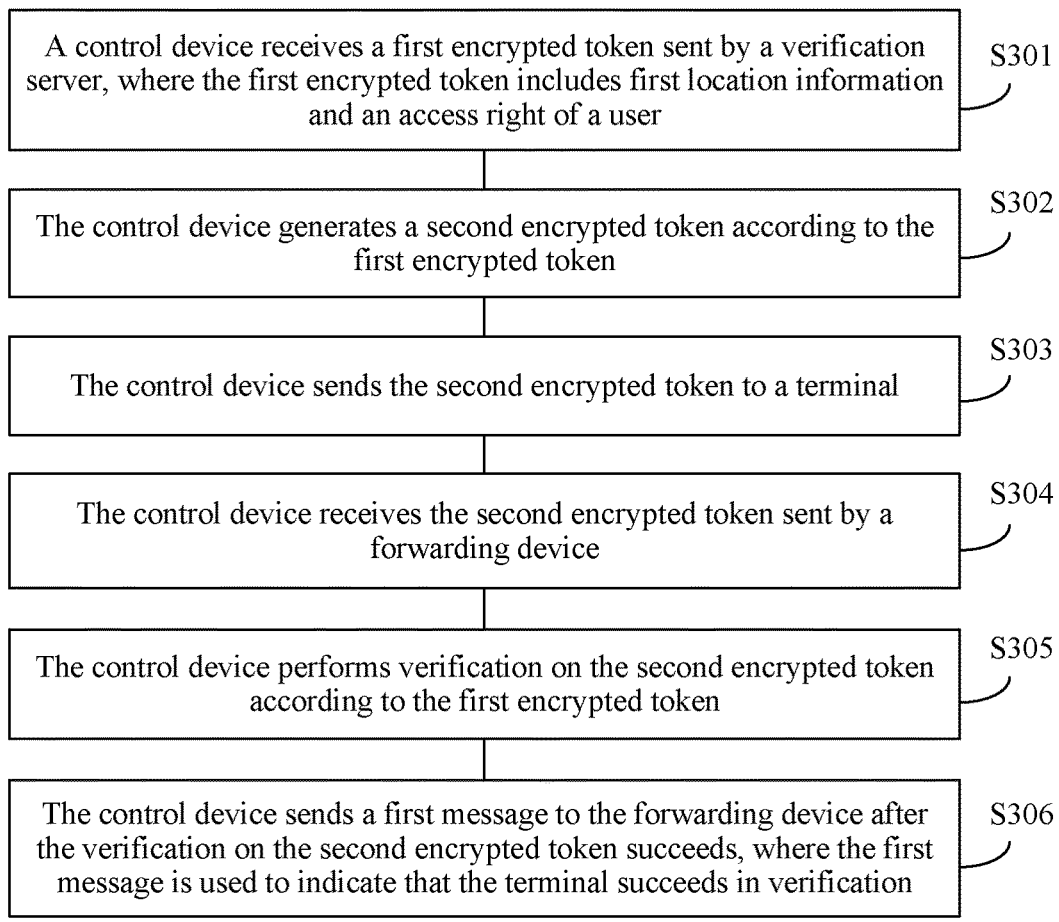
FIG. 4 is yet still another flowchart of a verification method used for network application access according to an embodiment of the present invention.

In this embodiment of the present invention, a verification method used for network application access is described from a perspective of a control device. As shown in FIG. 4, the method provided in this embodiment includes the following steps.

S301. The control device receives a first encrypted token sent by a verification server, where the first encrypted token includes first location information and an access permission of a user, the first location information is used to identify a network location at which the terminal is located when sending the user verification request, and the access permission of the user includes a list of content that can be accessed by the user.

For example, the first encrypted token received by the control device is an encrypted token generated by the verification server. For a specific generation process, refer to the embodiment corresponding to FIG. 2, and details are not described herein.

S302. The control device generates a second encrypted token according to the first encrypted token, where the second encrypted token includes the first location information.

For example, after receiving the first encrypted token, the control device may obtain the first location information by parsing the token, and therefore, may establish, according to the first location information, a correspondence between a network location of the terminal and a list of content that can be accessed by the user. For example, if the control device stores a public key of the verification server, the first encrypted token may be data obtained after encrypting the first location information and the access permission of the user by using a private key of the verification server. The control device may decrypt the first encrypted token by using the public key of the verification server, to obtain the first location information and the access permission of the user. The controller device may encrypt the first location information by using a key of the controller device, so as to obtain the second encrypted token.

S303. The control device sends the second encrypted token to the terminal.

For example, the control device may send the second encrypted token to the terminal according to the first location information included in the first encrypted token.

For example, S303 helps a valid terminal obtain a verification certificate for content access, that is, the terminal may send a content access request that includes the second encrypted token to a forwarding device, and the control device may perform verification on the terminal by using the second encrypted token from the forwarding device.

S304. The control device receives the second encrypted token sent by a forwarding device.

For example, the second encrypted token in S304 is the second encrypted token sent to the terminal by the control device in S303.

S305. The control device performs verification on the second encrypted token.

Because the second encrypted token is generated by the control device, it may be determined, by performing verification on the second encrypted token, whether the terminal that sends the content access request is a valid terminal.

For example, that the control device performs verification on the second encrypted token includes: The control device decrypts the second encrypted token sent by the forwarding device, to obtain the first location information included in the second encrypted token; and the control device compares the first location information with a content provision list on the controller, and determines that the terminal is a valid terminal if the content provision list includes the first location information. The content provision list is a list generated by the control device according to the first encrypted token. The content provision list includes the first location information included in the first encrypted token and the access permission of the user included in the first encrypted token.

S306. The control device sends a first message to the forwarding device after the verification on the second encrypted token succeeds, where the first message includes the access permission of the user, and the first message is used to indicate that the terminal succeeds in verification.

For example, the control device may send the first message to the forwarding device by using an OpenFlow protocol, and details are not described herein.

Further, in this embodiment of present invention, the method may further include a step of performing verification on a network location of the terminal, that is, in S305 or after S305, the method provided in this embodiment of the present invention further includes the following steps.

S311. The control device receives second location information sent by the forwarding device, where the second location information is the same as the first location information.

In this embodiment of the present invention, the control device may further receive the second location information sent by the forwarding device, so as to further improve security of performing content access by the terminal, and avoid another invalid terminal fraudulently using a token of a valid terminal. The second location information in this embodiment of the present invention is used to indicate a network address at which the terminal is located when sending the content access request. Optionally, the second location information may be added to the content access request by the terminal, or may be obtained by the verification server by parsing data of the user verification request sent by the terminal. When the second location information is added to the content access request by the terminal, the second location information may include a previous network location before the network location of the terminal is changed.

S312. The control device performs the verification on the terminal according to the second location information and the first location information.

For example, it may be verified whether the terminal that sends the content access request is a valid terminal by comparing the second location information with the first location information in the second encrypted token. Specifically, because an invalid terminal cannot obtain the first location information in the second encrypted token, the invalid terminal cannot obtain the second location information with content same as that of the first location information.

S313. The control device sends the first message to the forwarding device after the terminal succeeds in the verification and the verification on the second encrypted token succeeds.

If the verification performed by the control device on the encrypted token succeeds, it indicates that the terminal that sends the content access request is a valid terminal. In this case, the control device sends the first message to the forwarding device.

Because the first message is used to indicate that the terminal succeeds in the verification, and includes the access permission of the user, the forwarding device may provide, according to the access permission of the user in the first message, the terminal with content requested by the terminal.

Further, in this embodiment of the present invention, a step of updating an encrypted token is further included, so that the location information in the encrypted token used by the terminal is always consistent with a location at which the terminal is located when sending the content access request, thereby improving security of the encrypted token. After S306, the method provided in this embodiment of the present invention further includes the following steps.

S321. The control device receives third location information sent by the forwarding device, where the third location information is used to identify a network location at which the terminal is located when sending a content access request, and the third location information is different from the second location information.

For example, when the terminal sends the content access request after the network location of the terminal is changed, the third location information obtained by the forwarding device by parsing data of the content access request is different from the second location information. Therefore, the control device may determine, according to a comparison result between the third location information and the second location information, whether the network location of the terminal is changed.

S322. The control device generates a third encrypted token according to the third location information, where the third encrypted token includes the third location information.

For example, when the control device determines that the network location of the terminal is changed, because the terminal is a valid terminal, the control device generates an updated encrypted token, that is, the third encrypted token, according to a changed network location of the terminal, that is, the third location information, so as to further improve security of the encrypted token. In this application, the control device generates the third encrypted token after the network location of the terminal is changed.

S323. The control device sends the third encrypted token to the terminal.

A method for generating the third encrypted token by the control device is the same as a method for generating the second encrypted token by the control device, and details are not described herein.

After updating the encrypted token, the control device sends the updated encrypted token, that is, the third encrypted token, to the terminal, so that the terminal with the network location changed can use the new encrypted token.

Further, in this embodiment of the present invention, the method further includes a step of updating the content provision list. The method provided in this embodiment of the present invention further includes the following steps.

S331. The control device replaces the first location information in a content provision list with the third location information, to obtain an updated content provision list, where the content provision list is a list generated according to the first encrypted token, the content provision list includes the first location information and the access permission of the user that are included in the first encrypted token, and the updated content provision list includes the third location information and the access permission of the user.

Alternatively, the control device adds the third location information to a content provision list, to obtain an updated content provision list, where the content provision list is a list generated according to the first encrypted token, the content provision list includes the first location information and the access permission of the user that are included in the first encrypted token, and the updated content provision list includes the third location information, and the first location information and the access permission of the user that are included in the first encrypted token.

In this embodiment of the present invention, the control device may record an encrypted token of each terminal by maintaining the content provision list. The content provision list may include a token identifier, a network location, a list of content that can be accessed by a user, and the like corresponding to each encrypted token.

The content provision list may be synchronously updated after the encrypted token is updated for the terminal, so that content in the content provision list matches the updated encrypted token, thereby facilitating token verification of the control device.

Optionally, a specific manner of updating the content provision list may be replacing, that is, replacing the first location information in the content provision list with the third location information, to obtain the updated content provision list. Alternatively, the manner may further be: adding a record corresponding to the updated encrypted token, that is, adding the third location information to the content provision list.

Further, in this embodiment of the present invention, the method further includes a token cancellation step, which is specifically as follows:

S341. The control device receives a token cancellation request sent by the verification server, where the token cancellation request includes fourth location information of the terminal, and the fourth location information is used to identify a network location at which the terminal is located when sending a user exit request.

The control device cancels, according to the fourth location information, an encrypted token that matches the fourth location formation. A cancellation operation may be deleting the fourth location information and/or the encrypted token that matches the fourth location formation, or invalidating the encrypted token.

When the user needs to exit access to an access object, the verification server receives the user exit request sent by the terminal. In this case, the verification server needs to obtain the fourth location information. In this embodiment of the present invention, the fourth location information includes the network location at which the terminal is located when the terminal sends the user exit request. Optionally, the fourth location information may be obtained by the terminal according to the network location at which the terminal is located when sending the user exit request, and the fourth location information is added to the user verification request;

or may be obtained by the verification server by parsing data of the user exit request sent by the terminal.

In this embodiment provided by the present invention, a control device may verify validity of an encrypted token according to first location information of a terminal and a second encrypted token from the terminal. Verification does not need to be performed each time to the encrypted token by a verification server. In a verification manner in this embodiment of the present invention, it may be determined whether a terminal that performs content access is a terminal used by a user on which user verification is performed. This can effectively avoid an application-layer-based network attack such as an MITM attack, and effectively improve security of network application access.

Embodiment 4

Figure 5:
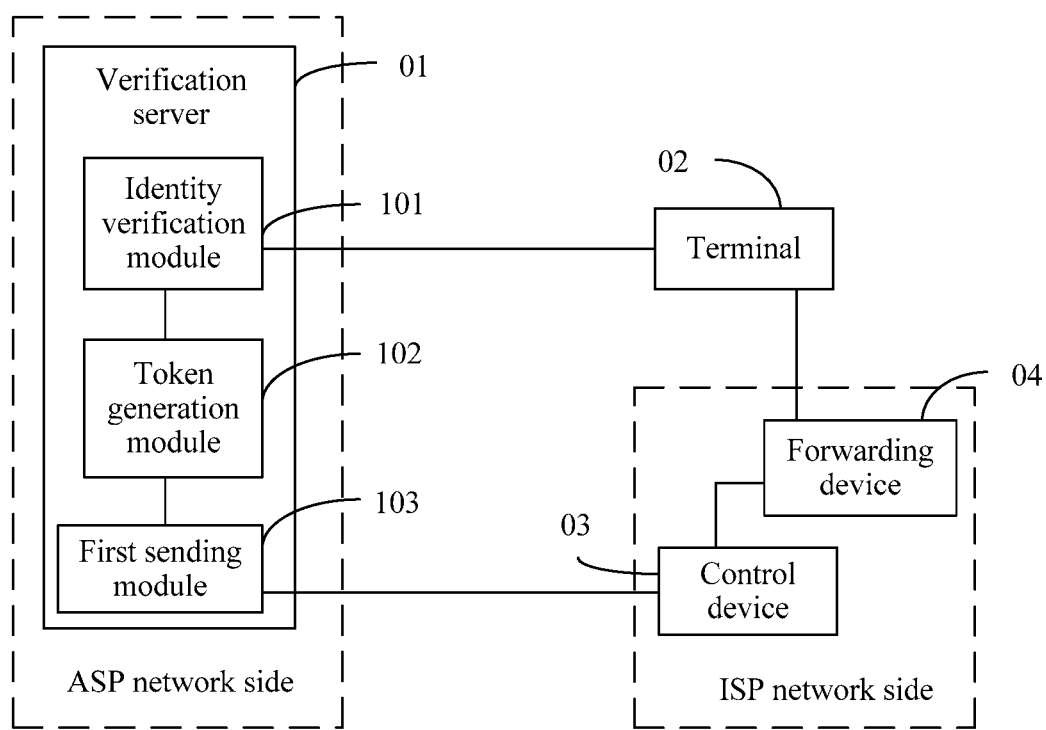
FIG. 5 is a schematic structural diagram of a verification server according to an embodiment of the present invention.

The present invention further provides a verification server used for network application access. As shown in FIG. 5, a verification server 01 includes an identity verification module 101, a token generation module 102, and a first sending module 103.

The identity verification module 101 is configured to perform, according to a user verification request from a terminal 02, user identity verification on the terminal 02, where the user verification request includes first location information, and the first location information is used to identify a network location at which the terminal 02 is located when sending the user verification request.

When accessing an access object by using the terminal 02, a user first needs to succeed in identity verification performed by the identity verification module 101, to determine validity of the user.

Optionally, the identity verification module 101 receives the user verification request from the terminal 02. The user verification request may include data information that is used for user identity verification and required by a conventional application-layer verification manner, for example, a user name and a password of the user, a certificate and a signature of the user, or the like.

In addition, the identity verification module 101 may further obtain the first location information by using the user verification request. Specifically, the first location information is the network location at which the terminal 02 is located when sending the user verification request. Optionally, the first location information may be obtained by the terminal 02 according to the network location at which the terminal 02 is located when sending the user verification request, or may be obtained by the identity verification module 101 by parsing data of the user verification request sent by the terminal 02.

Optionally, in this embodiment of the present invention, a network location of the terminal may be an IP address, a MAC address, an IMEI, or the like of the terminal. Certainly, network location information may further be other location information of the terminal, provided that the location of the terminal can be identified in a network, and this is not specifically limited herein.

The token generation module 102 is configured to generate an encrypted token according to the first location information in the user verification request after determining that the terminal 02 succeeds in the user identity verification, where the encrypted token includes the first location information and an access permission of a user, and the access permission of the user includes a list of content that can be accessed by the user.

The token generation module 102 generates the encrypted token according to the first location information after determining that a user on which identity verification is performed is a valid user. In this case, the encrypted token is sent to a control device 03, and used by the control device 03 to determine a network location of a terminal that is allowed to perform content access to an access object.

In addition, the encrypted token herein further includes an access permission of a user that succeeds in identity verification. In this way, a correspondence between the first location information and a corresponding access permission may be established. Therefore, an access permission of a terminal that matches a network location in the first location information may be determined.

The first sending module 103 is configured to send the encrypted token to the control device 03.

The first sending module 103 needs to send the encrypted token to the control device 03, so that the control device 03 may perform verification on a terminal that performs content access, and may determine a corresponding permission of a valid terminal.

Figure 6:
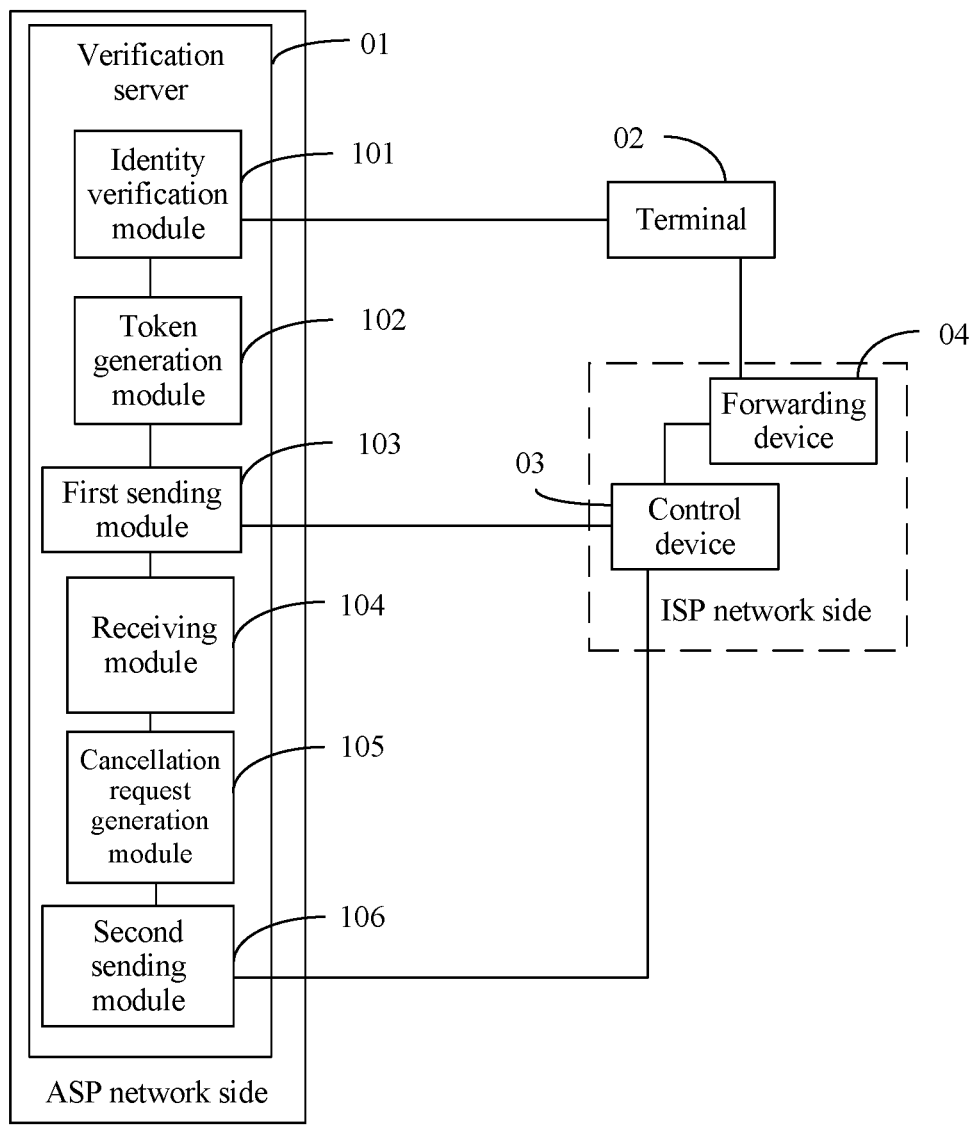
FIG. 6 is another schematic structural diagram of a verification server according to an embodiment of the present invention.

Further, to improve security of the encrypted token, in this embodiment of the present invention, as shown in FIG. 6, the verification server 01 may further include a receiving module 104, a cancellation request generation module 105, and a second sending module 106.

The receiving module 104 is configured to receive a user exit request sent by the terminal 02, where the user exit request includes second location information, and the second location information is used to identify a network location at which the terminal 02 is located when sending the user exit request.

When the user needs to exit access to the access object, the receiving module 104 receives the user exit request sent by the terminal 02. In this case, the receiving module 104 needs to obtain the second location information. In this embodiment of the present invention, the second location information includes the network location at which the terminal 02 is located when sending the user exit request. Optionally, the second location information may be obtained by the terminal 02 according to the network location at which the terminal 02 is located when sending the user exit request, and the second location information is added to the user verification request; or may be obtained by the receiving module 104 by parsing data of the user exit request sent by the terminal 02.

The cancellation request generation module 105 is configured to generate a token cancellation request according to the second location information, where the token cancellation request includes the second location information.

The token cancellation request includes the second location information if the cancellation request generation module 105 generates the token cancellation request according to the second location information. Therefore, the control device 03 may know a terminal whose encrypted token needs to be canceled.

The second sending module 106 is configured to send the token cancellation request to the control device 03.

To notify the control device of a terminal whose encrypted token is invalid, and avoid fraudulent use, the second sending module 106 sends the token cancellation request to the control device 03, so that the control device 03 may cancel the encrypted token corresponding to the terminal that sends the user exit request. Optionally, in this embodiment of the present invention, canceling the encrypted token may specifically include deleting a related record of the encrypted token on the control device, for example, a token identifier, an IP address, a list of content that can be accessed by the user, or the like corresponding to the terminal that sends the user exit request.

It may be learned from the above that, according to the verification server used for network application access in this embodiment of the present invention, identity verification needs to be performed on an access user, and in addition, it needs to be determined, upon content access and by using an encrypted token that includes a network location of a terminal, whether the terminal that performs the content access is valid. In a terminal verification manner of this embodiment of the present invention, it may be determined whether a terminal that performs the content access is a terminal used by a user on which user verification is performed. Therefore, this can effectively avoid an application-layer-based network attack such as an MITM attack, and further effectively improve security of the network application access.

Embodiment 5

Figure 7:
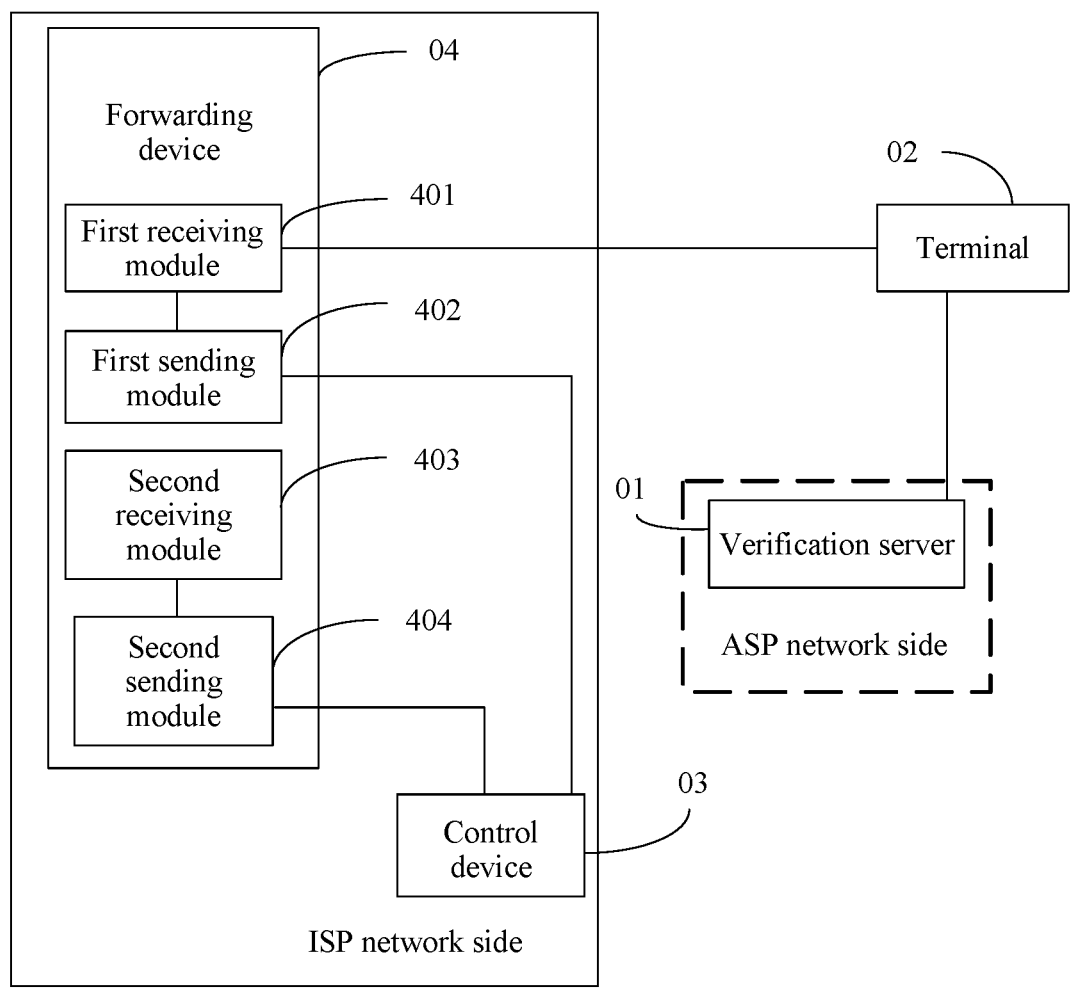
FIG. 7 is a schematic structural diagram of a forwarding device according to an embodiment of the present invention.

Another aspect of the embodiments of the present invention further provides a forwarding device 04 used for network application access. As shown in FIG. 7, the forwarding device 04 includes a first receiving module 401, a first sending module 402, a second receiving module 403, and a second sending module 404.

The first receiving module 401 is configured to receive a content access request sent by a terminal 02, where the content access request includes an encrypted token, the encrypted token includes first location information, and the first location information is used to identify a network location at which the terminal 02 is located when sending the user verification request.

In this embodiment of the present invention, the forwarding device 04 may specifically include a network device equipped with a cache, for example, may be a switch equipped with a cache. The cache may be specifically used to store an access object of the terminal. In addition, the forwarding device 04 further forwards data, for example, forwards, to a control device 03, data sent by the terminal 02, or forwards, to the terminal 02, data sent by the control device 03. Moreover, the forwarding device 04 may further obtain a network location of a terminal that performs data communication with the forwarding device. In a typical application scenario of this embodiment of the present invention, the forwarding device 04 may be disposed in a network on an ISP side.

In the embodiment corresponding to FIG. 5, the terminal 02 obtains the encrypted token, and the terminal 02 requests, by sending the content access request to the first receiving module 401, to perform content access. The content access request of the terminal obtained by the first receiving module 401 includes the encrypted token, It should be noted that, in this embodiment of the present invention, the encrypted token included in the content access request is generated and sent to the terminal 02 by the control device 03, and is different from an encrypted token generated and sent to the control device 03 by a verification server 01.

The first sending module 402 is configured to send the encrypted token to the control device 03.

Because the forwarding device 04 does not have a terminal verification function, the encrypted token included in the content access request is sent to the control device 03 by using the first sending module 402. Because the encrypted token is generated and sent to the terminal by the control device 03, the control device 03 can perform verification on the encrypted token.

The second receiving module 403 is configured to receive a first message sent by the control device 03, where the first message includes an access permission of a user, and the first message is used to indicate that the terminal 02 succeeds in verification.

If the verification performed by the control device 03 on the encrypted token succeeds, it indicates that the terminal that sends the content access request is a valid terminal. In this case, the second receiving module 403 receives the first message sent by the control device.

The second sending module 404 is configured to provide, according to the access permission of the user in the first message, the terminal 02 with content requested by the terminal 02.

Because the first message is used to indicate that the terminal 02 succeeds in the verification, and includes the access permission of the user, the second sending module 404 may provide, according to the access permission of the user in the first message, the terminal 02 with the content requested by the terminal 02.

Figure 8:
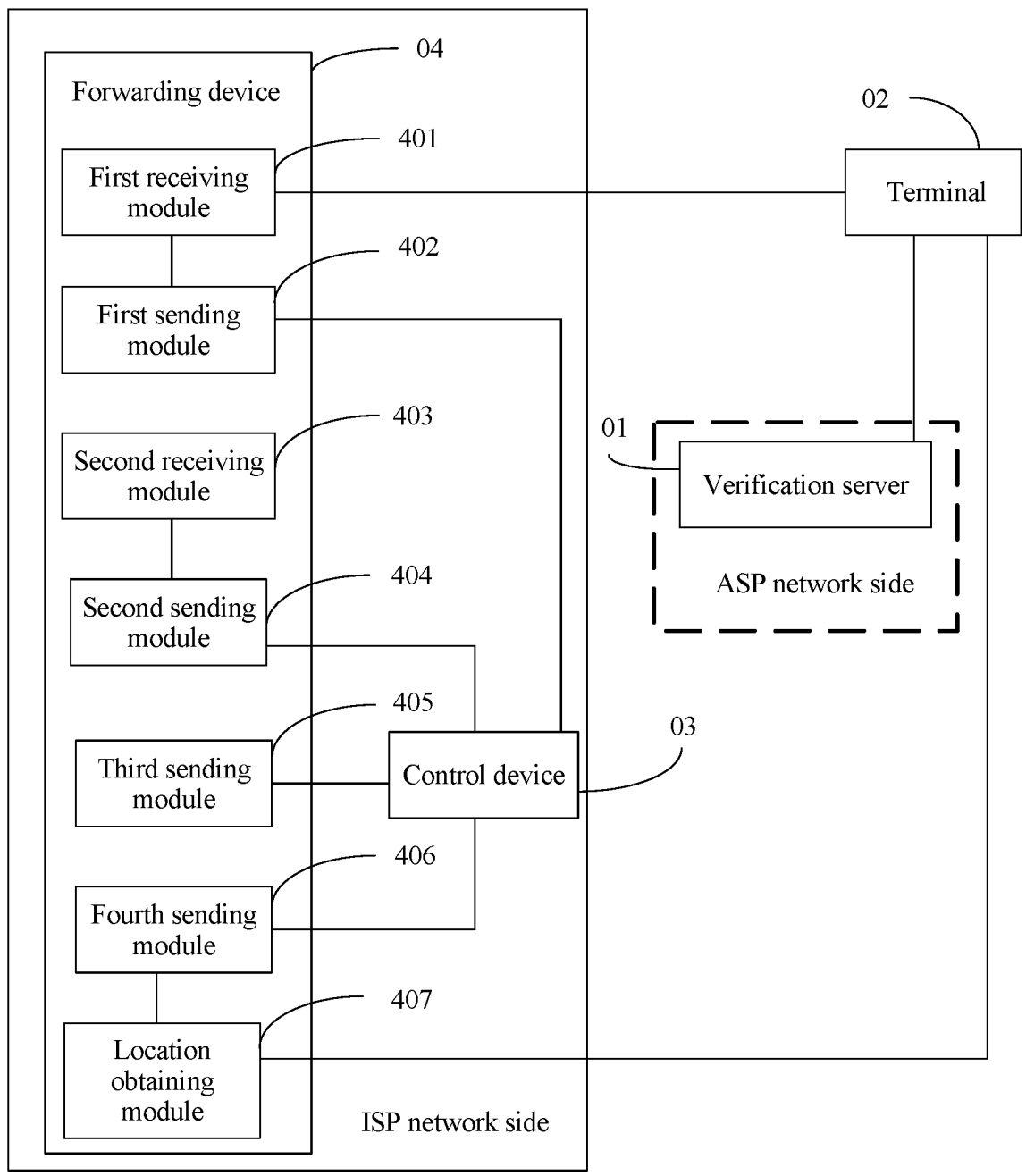
FIG. 8 is another schematic structural diagram of a forwarding device according to an embodiment of the present invention.

Further, in this embodiment of the present invention, as shown in FIG. 8, the content access request further includes second location information, and the forwarding device 04 further includes:

a third sending module 405, configured to send the second location information to the control device.

In this embodiment of the present invention, the terminal 02 may further add the second location information to the content access request, so as to further improve security of performing content access by the terminal, and avoid another invalid terminal fraudulently using a token of a valid terminal. The second location information in this embodiment of the present invention is location information that indicates a network location at which the terminal is located when sending the content access request, and the location information is included in the content access request and has content same as that of the first location information. Optionally, the second location information may be added to the content access request by the terminal, or may be obtained by the verification server by parsing data of the user verification request sent by the terminal. When the second location information is added to the content access request by the terminal, the second location information may include a previous network location before the network location of the terminal is changed.

In this embodiment of the present invention, it may be verified whether the terminal that sends the content access request is a valid terminal by comparing the second location information with the first location information in a second encrypted token. Specifically, because an invalid terminal cannot obtain the first location information in the second encrypted token, the invalid terminal cannot obtain the second location information with the content same as that of the first location information. Therefore, the security of performing content access by the terminal is improved.

Further, in this embodiment of the present invention, when the content access request includes third location information, the forwarding device may further include a location obtaining module 406 and a fourth sending module 407.

The location obtaining module 406 is configured to obtain the third location information from the content access request.

In this embodiment of the present invention, the location obtaining module 406 needs to obtain the third location information, and sends a changed network location to the control device 03 after the network location of the terminal 02 is changed. In this way, the location information in the encrypted token used by the terminal 02 is always consistent with a location at which the terminal is located when sending the content access request, thereby improving security of the encrypted token. Therefore, the third location information is first obtained from the content access request. The third location information is used to identify the network location at which the terminal 02 is located when sending the content access request. Because the network location of the terminal is changed at this time, the third location information is different from the second location information.

The fourth sending module 407 is configured to send the third location information to the control device 03.

The third location information is sent to the control device 03, so that the control device 03 may generate an updated encrypted token according to the third location information, to improve security of the encrypted token.

It may be learned from the above that, according to the forwarding device used for network application access in this embodiment of the present invention, identity verification needs to be performed on an access user, and in addition, it needs to be determined, upon content access and by using an encrypted token that includes a network location of a terminal, whether the terminal that performs the content access is valid. In a terminal verification manner of this embodiment of the present invention, it may be determined whether a terminal that performs the content access is a terminal used by a user on which user verification is performed. Therefore, this can effectively avoid an application-layer-based network attack such as an MITM attack, and further effectively improve security of the network application access.

Embodiment 6

Figure 9:
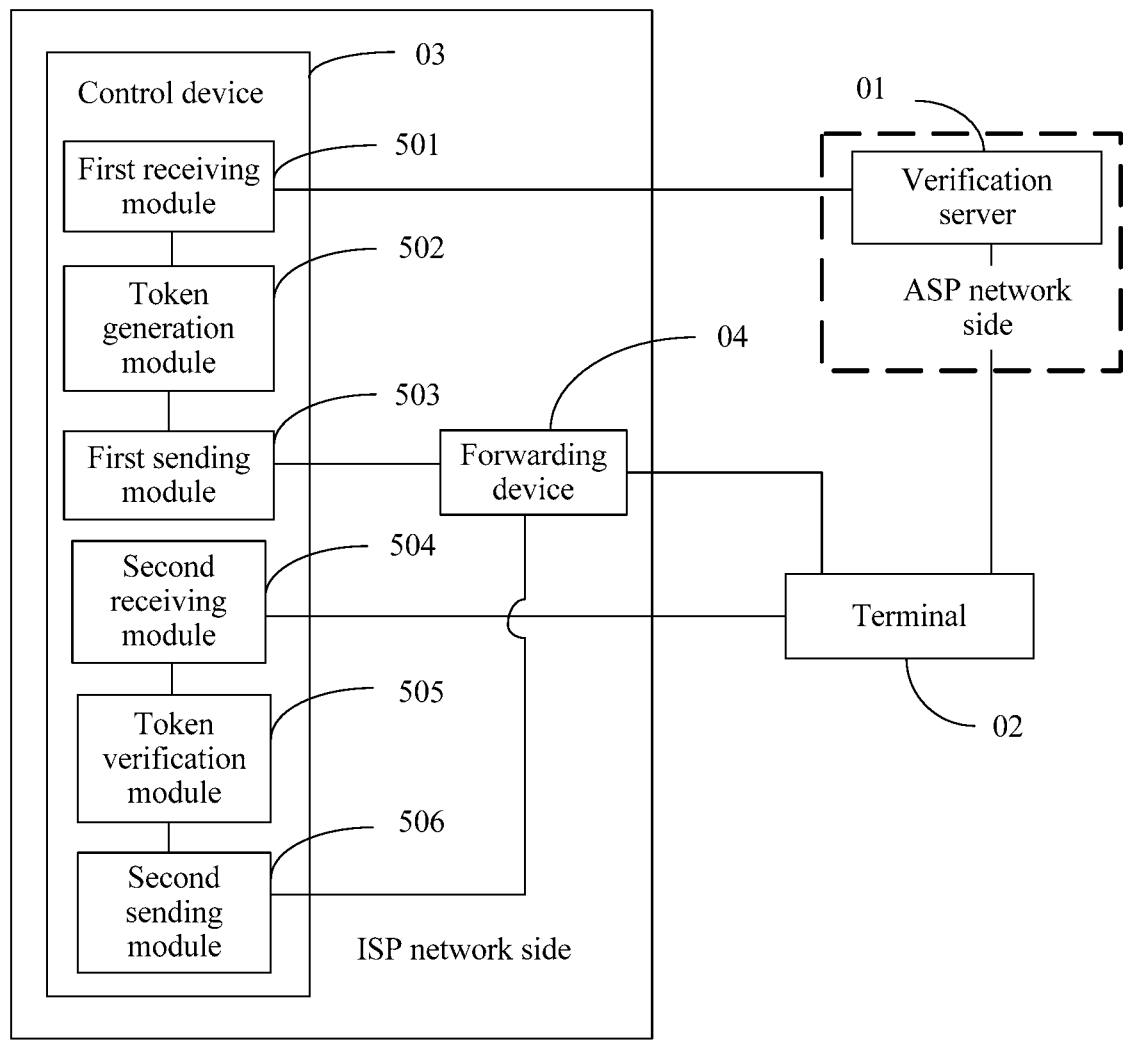
FIG. 9 is a schematic structural diagram of a control device according to an embodiment of the present invention.

Another aspect of the embodiments of the present invention further provides a control device used for network application access. As shown in FIG. 9, a control device 03 includes a first receiving module 501, a token generation module 502, a first sending module 503, a second receiving module 504, a token verification module 505, and a second sending module 506.

The first receiving module 501 receives a first encrypted token sent by a verification server 01, where the first encrypted token includes first location information and an access permission of a user, the first location information is used to identify a network location at which a terminal 02 is located when sending a user verification request, and the access permission of the user includes a list of content that can be accessed by the user.

The first encrypted token received by the first receiving module 501 is an encrypted token generated by the verification server 01. For a specific generation process, refer to the embodiment corresponding to FIG. 4, and details are not described herein.

The token generation module 502 generates a second encrypted token according to the first encrypted token, where the second encrypted token includes the first location information.

After receiving the first encrypted token, the first receiving module 501 may obtain the first location information by parsing the token, and therefore, may establish, according to the first location information, a correspondence between a network location of the terminal and a list of content that can be accessed by the user, and obtain the access permission of the user corresponding to the terminal.

The token generation module 502 further generates the second encrypted token according to the network location in the first location information, so that the control device 03 may verify whether the terminal 02 that performs content access is valid.

The first sending module 503 sends the second encrypted token to the terminal 02.

The second encrypted token is sent to the terminal, so that a valid terminal may obtain a verification certificate for content access, that is, terminal verification may be performed on the terminal 02 by using a content access request that includes the second encrypted token.

The second receiving module 504 receives the second encrypted token sent by a forwarding device 04.

The terminal 02 sends the content access request to the forwarding device when sending the content access request. The control device may obtain the second encrypted token by using forwarding of the forwarding device.

The token verification module 505 performs verification on the second encrypted token.

Because the second encrypted token is generated by the token generation module 502, the token verification module 505 may determine, by performing the verification on the second encrypted token, whether the terminal that sends the content access request is a valid terminal.

The second sending module 506 sends a first message to the forwarding device after the verification on the second encrypted token succeeds, where the first message includes the access permission of the user, and the first message is used to indicate that the terminal 02 succeeds in the verification.

The second sending module 506 sends the first message to the forwarding device 04, so that the forwarding device 04 may provide the terminal 02 with content requested by the terminal.

Further, in this embodiment of the present invention, the control device may further include a third receiving module, a terminal verification module, and a third sending module.

The third receiving module receives second location information sent by the forwarding device 04, where the second location information is the same as the first location information.

In this embodiment of the present invention, the third receiving module may further receive the second location information sent by the forwarding device, so as to further improve security of performing content access by the terminal, and avoid another invalid terminal fraudulently using a token of a valid terminal. The second information in this embodiment of the present invention is location information of the terminal 02 when the terminal 02 sends the content access request, and the location information is included in the content access request and has content same as that of the first location information. Optionally, the second location information may be added to the content access request by the terminal 02, or may be obtained by the verification server 01 by parsing data of the user verification request sent by the terminal 02. When the second location information is added to the content access request by the terminal 02, the second location information may include a previous network location before the network location of the terminal 02 is changed.

The terminal verification module performs the verification on the terminal 02 according to the second location information and the first location information.

The terminal verification module may verify whether the terminal that sends the content access request is a valid terminal by comparing the second location information with the first location information in the second encrypted token. Specifically, because an invalid terminal cannot obtain the first location information in the second encrypted token, the invalid terminal cannot obtain the second location information with content same as that of the first location information.

The third sending module sends the first message to the forwarding device 04 after the terminal succeeds in the verification and the verification on the second encrypted token succeeds.

If the verification performed by the terminal verification module on the encrypted token succeeds, it indicates that the terminal that sends the content access request is a valid terminal. In this case, the third sending module sends the first message to the forwarding device 04.

Because the first message is used to indicate that the terminal succeeds in the verification, and includes the access permission of the user, the forwarding device may provide, according to the access permission of the user in the first message, the terminal with the content requested by the terminal.

Further, in this embodiment of the present invention, the control device 03 further includes a fourth receiving module, a token update module, and a fourth sending module, so that the location information in the encrypted token used by the terminal is always consistent with a location at which the terminal is located when sending the content access request, thereby improving security of the encrypted token.

The fourth receiving module receives third location information sent by the forwarding device 04, where the third location information is used to identify the network location at which the terminal 02 is located when sending the content access request, and the third location information is different from the second location information.

When the terminal 02 sends the content access request after the network location of the terminal 02 is changed, the third location information obtained by the forwarding device 04 by parsing data of the content access request is different from the second location information. Therefore, the fourth receiving module may determine, according to a comparison result between the third location information and the second location information, whether the network location of the terminal is changed.

The token update module generates a third encrypted token according to the third location information, where the third encrypted token includes the third location information.

When the fourth receiving module determines that the network location of the terminal is changed, because the terminal 02 is a valid terminal, the token update module generates an updated encrypted token, that is, the third encrypted token, according to a changed network location of the terminal, that is, the third location information, so as to further improve security of the encrypted token. In this application, the token update module generates the third encrypted token after the network location of the terminal is changed.

The fourth sending module sends the third encrypted token to the terminal 02.

After the encrypted token is updated, the fourth sending module sends the updated encrypted token, that is, the third encrypted token, to the terminal, so that the terminal whose network location is changed can use the new encrypted token.

Further, in this embodiment of the present invention, the control device further includes an update module.

The update module replaces the first location information in a content provision list with the third location information, to obtain an updated content provision list, where the content provision list is a list generated according to the first encrypted token, the content provision list includes the first location information and the access permission of the user that are included in the first encrypted token, and the updated content provision list includes the third location information and the access permission of the user.

Alternatively, the update module adds the third location information to a content provision list, to obtain an updated content provision list, where the content provision list is a list generated according to the first encrypted token, the content provision list includes the first location information and the access permission of the user that are included in the first encrypted token, and the updated content provision list includes the third location information, and the first location information and the access permission of the user that are included in the first encrypted token.

In this embodiment of the present invention, the update module may record an encrypted token of each terminal by maintaining the content provision list. The content provision list may include a token identifier, a network location, a list of content that can be accessed by a user, and the like corresponding to each encrypted token.

The content provision list may be synchronously updated after the encrypted token is updated for the terminal, so that content in the content provision list matches the updated encrypted token, thereby facilitating token verification of the control device.

Optionally, a specific manner of updating the content provision list may be replacing, that is, replacing the first location information in the content provision list with the third location information by the update module, to obtain the updated content provision list. Alternatively, the manner may further be adding a record corresponding to the updated encrypted token by the update module, that is, adding the third location information to the content provision list.

Further, in this embodiment of the present invention, the control device further includes a fifth receiving module and a token cancellation module.

The fifth receiving module receives a token cancellation request sent by the verification server 01, where the token cancellation request includes fourth location information of the terminal 02, and the fourth location information is used to identify a network location at which the terminal is located when sending a user exit request.

The token cancellation module cancels, according to the fourth location information, an encrypted token that matches the fourth location formation.

When the user that uses the terminal 02 needs to exit access to an access object, the verification server 01 receives the user exit request sent by the terminal 02. In this case, the verification server 01 needs to obtain the fourth location information. In this embodiment of the present invention, the fourth location information includes the network location at which the terminal 02 is located when the terminal 02 sends the user exit request. Optionally, the fourth location information may be obtained by the terminal 02 according to the network location at which the terminal is located when sending the user exit request, and the fourth location information is added to the user verification request; or may be obtained by the verification server 01 by parsing data of the user exit request sent by the terminal 02.

It may be learned from the above that, according to the control device used for network application access in this embodiment of the present invention, identity verification needs to be performed on an access user, and in addition, it needs to be determined, upon content access and by using an encrypted token that includes a network location of a terminal, whether the terminal that performs the content access is valid. In a terminal verification manner of this embodiment of the present invention, it may be determined whether a terminal that performs the content access is a terminal used by a user on which user verification is performed. Therefore, this can effectively avoid an application-layer-based network attack such as an MITM attack, and further effectively improve security of the network application access.

Embodiment 7

Another aspect of the embodiments of the present invention further provides a verification system used for network application access. As shown in FIG. 1, the verification system includes a verification server 01, a forwarding device 04, and a control device 03.

Because the verification server 01, the forwarding device 04, and the control device 03 are respectively corresponding to the verification server 01, the forwarding device 04, and the control device 03 in Embodiment 4, Embodiment 5, and Embodiment 6, structures, principles, and technical effects thereof are similar and are not repeatedly described herein.

According to the verification system used for network application access in this embodiment of the present invention, identity verification needs to be performed on an access user, and in addition, it needs to be determined, upon content access and by using an encrypted token that includes a network location of a terminal, whether the terminal that performs the content access is valid. In a terminal verification manner of this embodiment of the present invention, it may be determined whether a terminal that performs the content access is a terminal used by a user on which user verification is performed. Therefore, this can effectively avoid an application-layer-based network attack such as an MITM attack, and further effectively improve security of the network application access.

Correspondingly, an embodiment of the present invention further provides a verification server used for network application access. The verification server used for network application access may be disposed on a network device, such as a controller, a router, or a switch, or may be disposed on another independent device, and this is not separately illustrated. The verification server used for network application access may perform the method provided in the embodiment corresponding to FIG. 5. Referring to a schematic diagram shown in FIG. 10, the verification server may include: a processor 701, a memory 702, and a communications interface 703. The processor 701, the memory 702, and the communications interface 703 may be connected by using a communications bus 704. The memory 702 is configured to store a program, and the processor 701 performs a specific operation according to an executable instruction included in the program read from the memory 702.

Figure 10:
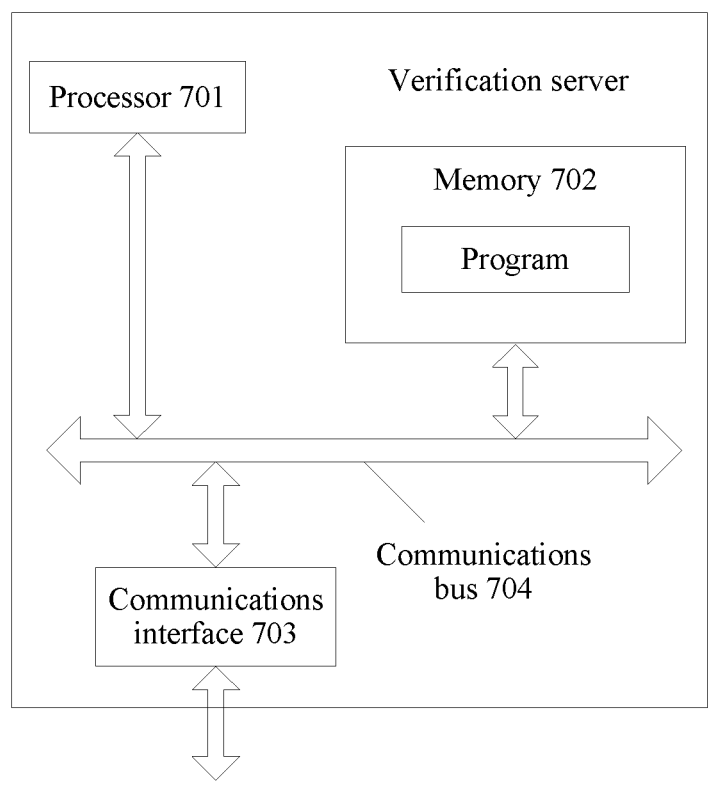
FIG. 10 is a schematic diagram of a hardware structure of a verification server according to an embodiment of the present invention.

Optionally, the identity verification module 101, the token generation module 102, and the first sending module 103 in FIG. 6 may be implemented by the processor 701 in FIG. 10 according to the executable instruction stored in the memory 702. The processor 701 may include at least one physical processor.

It should be noted that the verification server used for network application access shown in FIG. 5 and the verification server used for network application access shown in FIG. 10 may be a same apparatus. It may be considered that FIG. 5 shows content included in a verification server used for network application access from a physical perspective, and FIG. 10 shows content included in a verification server used for network application access from a logical perspective.

In the verification server used for network application access shown in FIG. 10, the processor 701 is configured to read an instruction and data stored in the memory 702, to perform the following operations:

performing, according to a user verification request from a terminal, user identity verification on the terminal, where the user verification request includes first location information, and the first location information is used to identify a network location at which the terminal is located when sending the user verification request;

generating an encrypted token according to the first location information in the user verification request after it is determined that the terminal succeeds in the user identity verification, where the encrypted token includes the first location information and an access permission of a user, and the access permission of the user includes a list of content that can be accessed by the user; and sending the encrypted token to a control device.

Correspondingly, an embodiment of the present invention further provides a forwarding device used for network application access. The forwarding device used for network application access may be disposed on a network device, such as a controller, a router, or a switch, or may be disposed on another independent device, and this is not separately illustrated. The forwarding device used for network application access may perform the method provided in the embodiment corresponding to FIG. 7. Referring to a schematic diagram shown in FIG. 11, the forwarding device may include: a processor 801, a memory 802, and a communications interface 803. The processor 801, the memory 802, and the communications interface 803 may be connected by using a communications bus 804. The memory 802 is configured to store a program, and the processor 801 performs a specific operation according to an executable instruction included in the program read from the memory 802.

Figure 11:
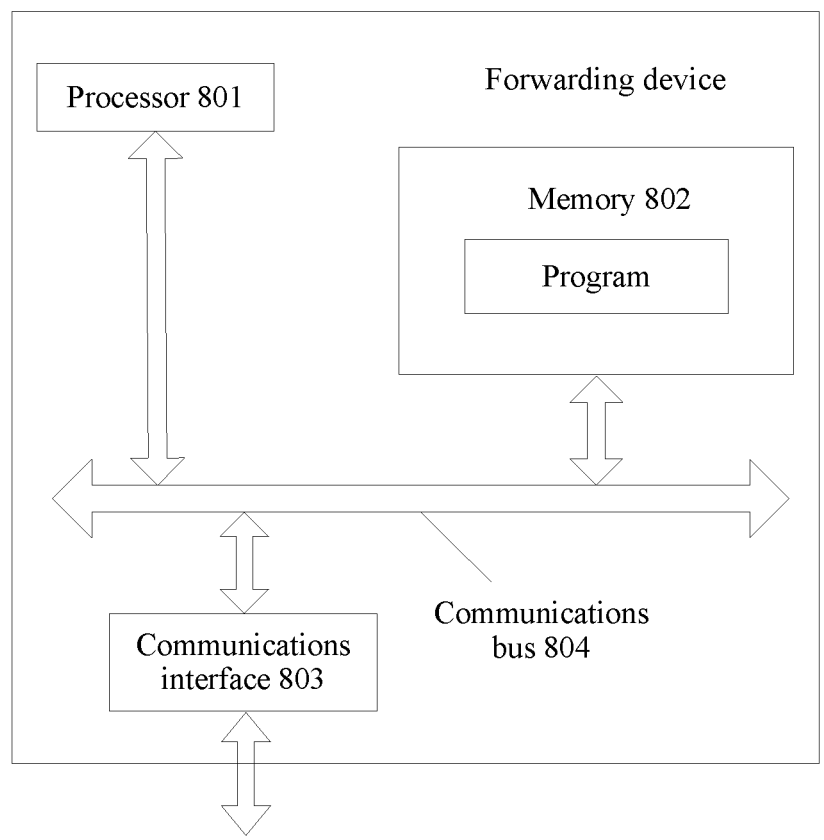
FIG. 11 is a schematic diagram of a hardware structure of a forwarding device according to an embodiment of the present invention.

Optionally, the first receiving module 401, the first sending module 402, the second receiving module 403, and the second sending module 404 in FIG. 7 may be implemented by the processor 801 in FIG. 11 according to the executable instruction stored in the memory 802. The processor 801 may include at least one physical processor.

It should be noted that the forwarding device used for network application access shown in FIG. 7 and the forwarding device used for network application access shown in FIG. 11 may be a same apparatus. It may be considered that FIG. 7 shows content included in a forwarding device used for network application access from a physical perspective, and FIG. 11 shows content included in a forwarding device used for network application access from a logical perspective.

In the forwarding device used for network application access shown in FIG. 11, the processor 801 is configured to read an instruction and data stored in the memory 802, to perform the following operations:

receiving a content access request sent by a terminal, where the content access request includes an encrypted token, the encrypted token includes first location information, and the first location information is used to identify a network location at which the terminal is located when sending the user verification request;

sending the encrypted token to a control device;

receiving a first message sent by the control device, where the first message includes an access permission of the user, and the first message is used to indicate that the terminal succeeds in verification; and providing, according to the access permission of the user in the first message, the terminal with content requested by the terminal.

Correspondingly, an embodiment of the present invention further provides a control device used for network application access. The control device used for network application access may be disposed on a network device, such as a controller, a router, or a switch, or may be disposed on another independent device, and this is not separately illustrated. The control device used for network application access may perform the method provided in the embodiment corresponding to FIG. 8. Referring to a schematic diagram shown in FIG. 12, the control device may include: a processor 901, a memory 902, and a communications interface 903. The processor 901, the memory 802, and the communications interface 903 may be connected by using a communications bus 904. The memory 902 is configured to store a program, and the processor 901 performs a specific operation according to an executable instruction included in the program read from the memory 902.

Figure 12:
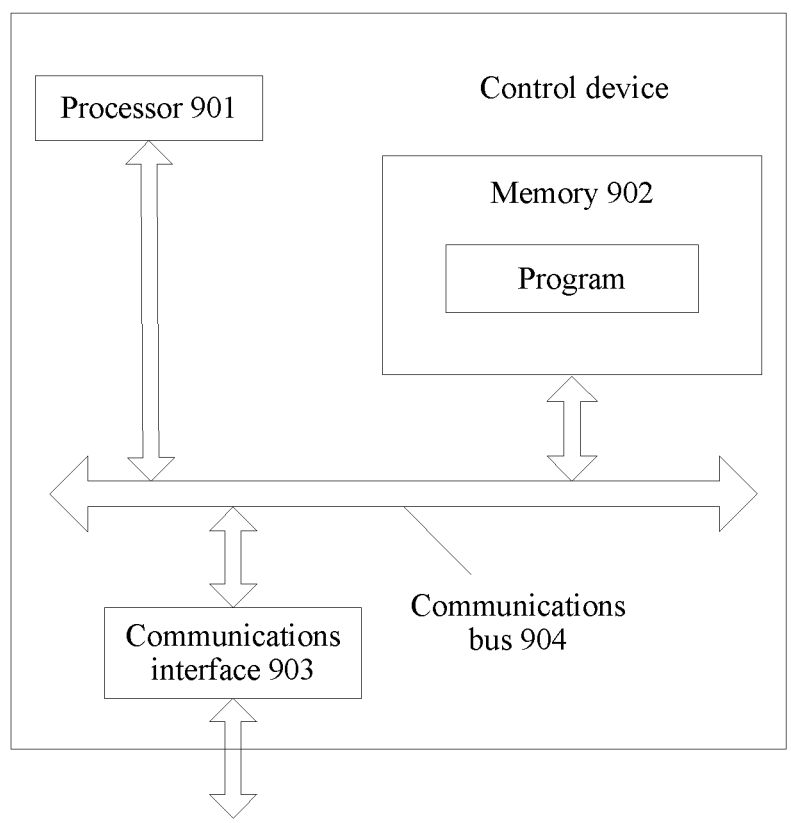
FIG. 12 is a schematic diagram of a hardware structure of a control device according to an embodiment of the present invention.

Optionally, the first receiving module 501, the token generation module 502, the first sending module 503, the second receiving module 504, the token verification module 505, and the second sending module 506 in FIG. 8 may be implemented by the processor 901 in FIG. 12 according to the executable instruction stored in the memory 902. The processor 901 may include at least one physical processor.

It should be noted that the control device used for network application access shown in FIG. 8 and the control device used for network application access shown in FIG. 12 may be a same apparatus. It may be considered that FIG. 8 shows content included in a control device used for network application access from a physical perspective, and FIG. 12 shows content included in a control device used for network application access from a logical perspective.

In the control device used for network application access shown in FIG. 12, the processor 901 is configured to read an instruction and data stored in the memory 902, to perform the following operations:

receiving a first encrypted token sent by a verification server, where the first encrypted token includes first location information and an access permission of a user, the first location information is used to identify a network location at which a terminal is located when sending a user verification request, and the access permission of the user includes a list of content that can be accessed by the user and;

generating a second encrypted token according to the first encrypted token, where the second encrypted token includes the first location information;

sending the second encrypted token to the terminal;

receiving the second encrypted token sent by a forwarding device;

performing verification on the second encrypted token according to the first encrypted token; and sending a first message to the forwarding device after the verification on the second encrypted token succeeds, where the first message includes the access permission of the user, and the first message is used to indicate that the terminal succeeds in verification.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present invention, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A verification method used for network application access, wherein the method comprises:

receiving, by a control device, a first encrypted token sent by a verification server, wherein the first encrypted token is an encrypted token generated by the verification server, the first encrypted token comprises first location information and an access permission of a user, and the first location information is used to identify a network location at which a terminal is located when sending a user verification request, and the access permission of the user comprises a list of content that can be accessed by the user;

decrypting, by the control device, the first encrypted token to obtain the first location information and the access permission of the user;

generating, by the control device, a second encrypted token according to the first encrypted token, wherein the second encrypted token comprises the first location information;

sending, by the control device, the second encrypted token to the terminal;

receiving, by the control device, a fourth encrypted token from the terminal and forwarded by a forwarding device, the fourth encrypted token is carried in a content access request sent by the terminal to the forwarding device;

verifying, by the control device, whether the fourth encrypted token is the same as the second encrypted token based on the first location information in the first encrypted token; and in response to the control device verifying that the fourth encrypted token is the same as the second encrypted token, sending, by the control device, a first message to the forwarding device, wherein the first message comprises the access permission of the user, and the first message indicates that the terminal succeeds in the verification.

2. The verification method according to claim 1, wherein the content access request further includes second location information, the method further comprises:

receiving, by the control device, the second location information sent by the forwarding device, wherein the second location information is the same as the first location information, the second location information is used to identify a network location at which the terminal is located when sending the content access request, wherein verifying whether the fourth encrypted token is the same as the second encrypted token is based on the second location information and the first location information.

3. The verification method according to claim 1, wherein the content access request further includes third location information, the method further comprises:

receiving, by the control device, the third location information sent by the forwarding device, wherein the third location information is used to identify a network location at which the terminal is located when sending the content access request, and the third location information is different from the first location information;

updating, by the control device, the second encrypted token based on the third location information, to obtain a third encrypted token, wherein the third encrypted token comprises the third location information; and sending, by the control device, the third encrypted token to the terminal.

4. The verification method according to claim 3, wherein the method further comprises at least one of:

replacing, by the control device, the first location information in a content provision list with the third location information, to obtain an updated content provision list, wherein the content provision list is a list generated according to the first encrypted token, the content provision list comprises the first location information and the access permission of the user that are comprised in the first encrypted token, and the updated content provision list comprises the third location information and the access permission of the user; and adding, by the control device, the third location information to a content provision list, to obtain an updated content provision list, wherein the content provision list is a list generated according to the first encrypted token, the content provision list comprises the first location information and the access permission of the user that are comprised in the first encrypted token, and the updated content provision list comprises the third location information, and the first location information and the access permission of the user that are comprised in the first encrypted token.

5. The verification method according to claim 1, wherein the method further comprises:

receiving, by the control device, a token cancellation request sent by the verification server, wherein the token cancellation request comprises fourth location information of the terminal, and the fourth location information is used to identify a network location at which the terminal is located when sending a user exit request; and canceling, by the control device according to the fourth location information, an encrypted token that matches the fourth location formation.

6. A verification server comprising:

a processor; and a non-transitory computer readable medium having stored thereon computer-executable instructions that when executed by the processor cause the processor to perform operations comprising:

verifying, according to a user verification request from a terminal, user identity verification on the terminal, wherein the user verification request comprises first location information, and the first location information is used to identify a network location at which the terminal is located when sending the user verification request;

generating a first encrypted token according to the first location information in the user verification request after determining that the terminal succeeds in the user identity verification, wherein the first encrypted token comprises the first location information and an access permission of a user, and the access permission of the user comprises a list of content that can be accessed by the user;

sending the first encrypted token to a control device, wherein the first encrypted token is used by the control device to decrypt the first encryption token to obtain the first location information and the access permission of the user and generate a second encrypted token, wherein the second encrypted token comprises the first location information, the second encrypted token is used by the control device to verify whether the second encrypted token is the same as an encrypted token in a content access request sent by the terminal to a forwarding device;

receiving a user exit request sent by the terminal, wherein the user exit request comprises second location information, and the second location information is used to identify a network location at which the terminal is located when sending the user exit request;

generating a token cancellation request according to the second location information, wherein the token cancellation request comprises the second location information; and sending the token cancellation request to the control device.

7. A control device comprising:

a processor; and a non-transitory computer readable medium having stored thereon computer-executable instructions that when executed by the processor cause the processor to perform operations comprising:

receiving a first encrypted token sent by a verification server, wherein the first encrypted token is an encrypted token generated by the verification server, the first encrypted token comprises first location information and an access permission of a user, the first location information is used to identify a network location at which a terminal is located when sending a user verification request, and the access permission of the user comprises a list of content that can be accessed by the user;

decrypting the first encrypted token to obtain the first location information and the access permission of the user;

generating a second encrypted token according to the first encrypted token, wherein the second encrypted token comprises the first location information;

sending the second encrypted token to the terminal;

receiving a fourth encrypted token from the terminal and forwarded by a forwarding device, the fourth encrypted token is carried in a content access request sent by the terminal to the forwarding device;

verifying whether the fourth encrypted token is the same as the second encrypted token based on the first location information in the first encrypted token; and in response to the control device verifying that the fourth encrypted token is the same as the second encrypted token, sending a first message to the forwarding device, wherein the first message comprises the access permission of the user, and the first message is used to indicate that the terminal succeeds in the verification.

8. The control device according to claim 7, wherein the content access request further includes second location information, the control device further comprises instructions for:

receiving the second location information sent by the forwarding device, wherein the second location information is the same as the first location information, the second location information is used to identify a network location at which the terminal is located when sending the content access request, wherein verifying whether the fourth encrypted token is the same as the second encrypted token is based on the second location information and the first location information.

9. The control device according to claim 7, wherein the content access request further includes third location information, the control device further comprises instructions for:

receiving the third location information sent by the forwarding device, wherein the third location information is used to identify a network location at which the terminal is located when sending the content access request, and the third location information is different from the first location information;

updating, by the control device, the second encrypted token based on the third location information, to obtain a third encrypted token, wherein the third encrypted token comprises the third location information; and sending the third encrypted token to the terminal.

10. The control device according to claim 9, wherein the control device further comprises instructions for:

replacing the first location information in a content provision list with the third location information, to obtain an updated content provision list, wherein the content provision list is a list generated according to the first encrypted token, the content provision list comprises the first location information and the access permission of the user that are comprised in the first encrypted token, and the updated content provision list comprises the third location information and the access permission of the user; or adding the third location information to a content provision list, to obtain an updated content provision list, wherein the content provision list is a list generated according to the first encrypted token, the content provision list comprises the first location information and the access permission of the user that are comprised in the first encrypted token, and the updated content provision list comprises the third location information, and the first location information and the access permission of the user that are comprised in the first encrypted token.

11. The control device according to claim 7 wherein the control device further comprises instructions for:

receiving a token cancellation request sent by the verification server, wherein the token cancellation request comprises fourth location information of the terminal, and the fourth location information is used to identify a network location at which the terminal is located when sending a user exit request; and cancelling, according to the fourth location information, an encrypted token that matches the fourth location formation.

* * * * *